United States Patent [19]

Kitamura

[11] Patent Number: 5,197,704
[45] Date of Patent: Mar. 30, 1993

[54] ANGLE ADJUSTING DEVICE FOR A DISPLAY DEVICE

[75] Inventor: Yoshiharu Kitamura, Komagane, Japan

[73] Assignee: NHK Spring Co., Ltd., Yokohama, Japan

[21] Appl. No.: 634,233

[22] Filed: Dec. 27, 1990

[30] Foreign Application Priority Data

Dec. 28, 1989 [JP] Japan .................. 1-151155[U]

[51] Int. Cl.$^5$ ............................................. F16M 13/00
[52] U.S. Cl. .................................. 248/292.1; 16/305; 16/342; 188/67; 403/146
[58] Field of Search ............... 248/292.1, 923; 16/342, 16/337, 305, 306, 307; 403/146, 373; 188/67, 77 W; 192/8 C

[56] References Cited

U.S. PATENT DOCUMENTS 5,018,244 5/1991 Hino ........................... 16/342

FOREIGN PATENT DOCUMENTS 331490 9/1989 European Pat. Off. ............ 403/146

Primary Examiner—David L. Talbott
Attorney, Agent, or Firm—Keck, Mahin & Cate

[57] ABSTRACT

An angle adjusting device for a display device has a pair of fixed axes abutted on the both ends of a rotatable axis and a pair of coil spring wound over the abutted portions. The angle of inclination of the display device is arbitrarily controlled by a total frictional torque obtained between the inner walls of the coil springs and the rotatable and fixed axes.

6 Claims, 2 Drawing Sheets

ANGLE ADJUSTING DEVICE FOR A DISPLAY DEVICE

BACKGROUND OF THE INVENTION

The present invention relates to an angle adjusting device for adjusting an angle of inclination of a display device such as a lap-top type word processor, a personal computer and various lid shaped components to be mounted movably on a main body.

It is necessary for display component to be adjusted to an adequate angular position which is adequate for operator. Therefore, the angle of inclination has been ajusted without step by using various angle adjusting devices. As disclosed by the Japanese Patent Application laid-open No. 63-23407 and Japanese Utility Model Application Publication No. 1-135397, conventional angle adjusting devices have a rotatble axis directly or indirectly mounted on a component necessitating an angle adjustment such as a display unit, a fixed axis mounted directly or indirectly on a main body and a coil spring closely inserted over the rotatable axis and the fixed axes for locking the rotation of the rotatable axis so as to surround. The display unit can be kept at an arbitrary angular position by means of frictional torque between the rotatable axis and the coil spring, and the rotatable axis can be rotated when an outer force stronger than the frictional torque is applied.

However, in the conventional angle adjusting devices, the rotatable axis is locked in forward and backward directions by using single coil spring, wherein a uniform locking force can be obtained in the both rotating directions. It is because of the frictional force obtained by using only one coil spring, which is impossible to change the locking force and is applied on some limited devices.

The present invention was developed by considering above situation and provides an angle adjusting device, wherein a locking force is arbitrarily selectable.

SUMMARY OF THE INVENTION

The present invention provides an angle adjusting device which has a rotatable axis with a large diameter portion on its center, a pair of fixed axis having a large diameter portion equal to the large diameter portion of the rotatable axis and a pair of coil spring closely inserted over the abutted portions of the rotatable axis and the fixed axisis so as to surround.

DETAILED DESCRIPTION OF THE PREFERRED EMBODIMENTS

Figure 1:
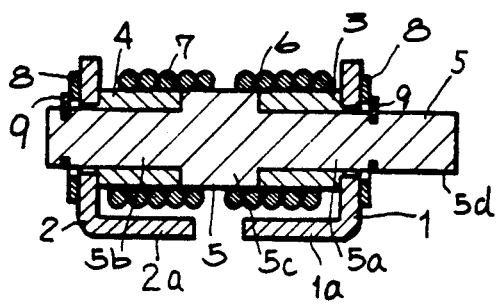
FIGS. 1 to 4 show a sectional view, a front view, a bottom view and a right side view of a first embodiment according to the present invention.
Figure 2:
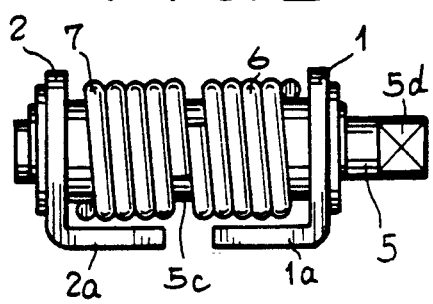
Figure 3:
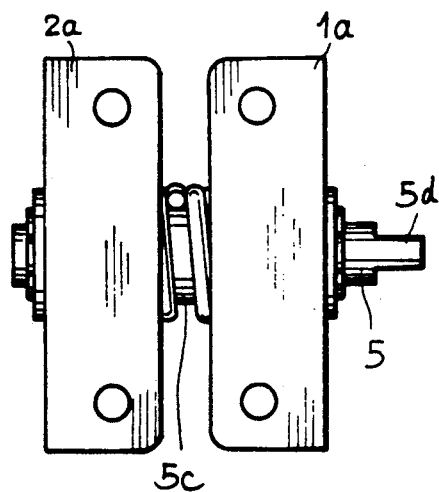

Hereinafter, some embodiments of the angle adjusting device according to the present invention will be described. Reference should be made to the drawings, in which identical elements are indicated with identical numbers so as to avoid repetitive description.

FIGS. 1 to 4 show a first embodiment of an angle adjusting device according to the present invention. The angle adjusting device for a display device is mounted on a pivoting portion of a supporting main body (not shown) and on the display device (not shown) necessitating an angular adjustment of inclination of the display device in relation to the main body. The angle adjusting device has a pair of bearing 1 and 2 to be fixed directly or indirectly on the main body, a pair of fixed axis 3 and 4 fitted on the bearings 1 and 2 respectively, a rotatable axis 5, having small diameter portions 5a and 5b, and a large diameter portion 5c, supported rotatably and coaxially by the fixed axes 3 and 4, bearings 1 and 2 and a pair of coil spring 6 and 7 externally and closely wound on the abutted portions of the large diameter portion 5c of the rotatable axis and the fixed axes 3 and 4.

The bearings 1 and 2 have foot portions 1a and 2a to be fixed end to end on the diaplay and the main body respectively.

The fixed axes 3 and 4 are of tubular form and are tightly fitted in the bearings 1 and 2 so as not to rotate. The rotatable axis 5 is retained by two flat washers 8 and two snap rings 9 for mounting the rotatable axis 5 on the bearings 1 and 2.

The right end of the rotatable axis 5 is extended outwardly to form a coupling portion 5d, having a rectangular or non circular section. The coupling portion 5d is fitted into a device necessitating an angular adjustment so as to be driven forward or backward when the display device is rotated. The large diameter portion 5c is located between the fixed axes 3 and 4. The outer diameter of the large diameter portion 5c is identical to the same of the fixed axes 3 and 4. The coil springs 6 and 7 are externally and closely wound on the abutted portions between the both sides of large diameter portion 5c of the rotatable axis 5 and the fixed axes 3 and 4.

The winding directions of the coil springs 6 and 7 are same. The inner diameters of the coil springs 6 and 7 are same and slightly smaller than the large diameter portion 5c of the rotatable axis 5 and the outer diameter of the fixed axes 3 and 4. Therefore, these springs have to be enlarged so as to be mounted over the abutted portions described above and released when mounted. Thus, a predetermined frictional force can be obtained between these coil springs 6 and 7 and the large diameter portion 5c of the rotatable axis 5 and the fixed axes 3 and 4. The both ends of these coil springs 6 and 7 are free. In addition, the numbers of windings of the coil springs 6 and 7 on the fixed axes 3 and 4 are less than those on the rotatable axis 5. Therefore, these coil springs 6 and 7 are rather fixed on the fixed axes 3 and 4. Accordingly, there is less frictional force between the rotatable axis 5 and the inner wall of the coil springs 6 and 7 than that between the inner wall of the coil springs 6 and 7 and the fixed axes 3 and 4.

Figure 4:
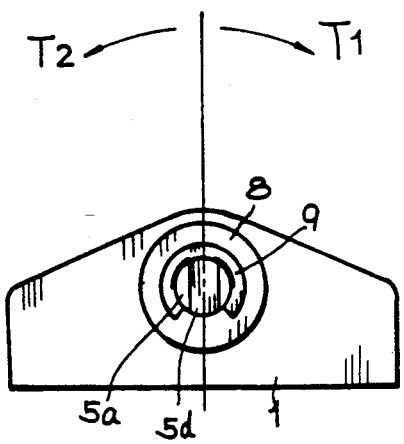

Having above structure, when a rotational force is applied on the rotatable axis 5 in the direction T1 so as to hold a display device (not shown) at a desired angle of inclination as shown in FIG. 4, the inner diameter of the coil spring 6 reduces and a sufficient frictional force for locking the large diameter portion 5c of the rotatable axis 5 is obtained from the coil spring 6. At the same time, the inner diameter of the coil spring 7 increases and an insufficient frictional force for locking the large diameter portion 5c of the rotatable axis 5 is obtained. Accordingly, the rotatable axis 5 is locked by the coil spring 6 and slips on the coil spring 7. In this manner, the display device connected to the rotatable axis 5 can be held at the desired angle of inclination.

When a rotational force is applied on the rotatable axis 5 in the direction T2, a slippage occurs between the inner wall of the coil spring 6 and the large diameter portion 5c of the rotatable axis 5, because the inner diameter of the coil spring 6 is enlarged by the rotational force. At the same time, a frictional force (locking torque) occurs between the inner wall of the coil spring 7 and the large diameter portion 5c of the rotatable axis 5, because the inner diameter of the coil spring 7 reduces. Accordingly, the rotation of the rotatable axis 5 in the direction T2 is controlled by the total frictional force obtained between the large diameter portion 5c of the rotatable axis and the inner walls of the coil springs 6 and 7 and the display device can be held at the desired angle of inclination.

In this manner, the rotatable axis 5 can be locked in the both directions T1 and T2 by the total value of frictional forces (frictional torques).

Accordingly, when the coil springs 6 and 7 of same physical features such as wire diameter, coil diameter and the number of windings are used, same frictional torques is obtained on the rotatable axis 5 in the rotating directions T1 and T2. When the coil springs 6 and 7 of different physical features are used, different frictional torques is obtained in the rotating directions T1 and T2. Also, the angle of inclination of the display device can be changed by applying an outer force superior to the total value of frictional forces of the springs.

In this case, the coil springs 6 and 7 of different winding direction may be used. Then, the total frictional torque of the springs can be obtained on the rotatable axis in a rotating direction and a slippage occurs in other rotating direction. In other words, a large frictional torque can be obtained to lock the rotatable axis in a desired direction.

Figure 5:
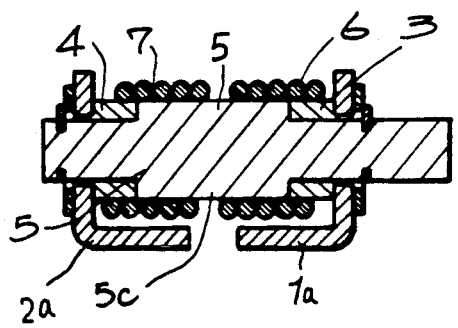
FIGS. 5 to 7 show a sectional view, a front view and a bottom view of a second embodiment.
Figure 6:
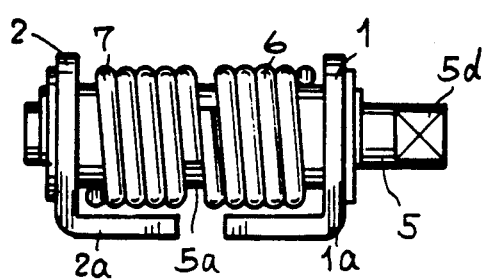
Figure 7:
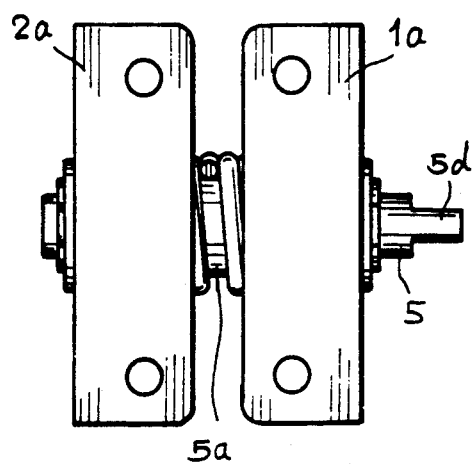

A second embodiment of the angle adjusting device according to the present invention will be described referring to FIGS. 5 to 7. In this case, a large diameter portion 5c of a rotatable axis 5 is longer than the both fixed axes 3 and 4, wherein the total number of effective windings of springs 6 and 7 on the large diameter portion 5c is larger than those on the fixed axes 3 and 4. Accordingly, both springs 6 and 7 are fixed on the rotatable axis 5 and rotate slipping on the fixed axes 3 and 4 together with the rotatable axis 5. In this case, the rotation of the large diameter portion 5c of the rotatable axis 5 is locked in the both directions T1 and T2 by the total frictional torque obtained between the coil springs 6 and 7 and the fixed axes 3 and 4 so as to hold the display device at a desired angle of inclination as in the first embodiment.

Figure 8:
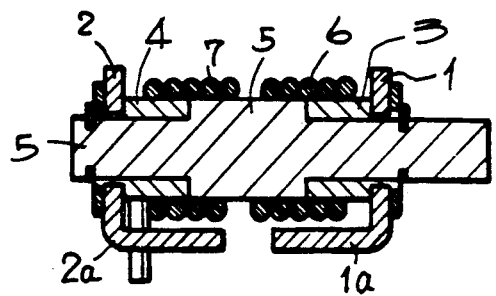
FIGS. 8 to 10 show a sectional view, a front view and a bottom view of a third embodiment.
Figure 9:
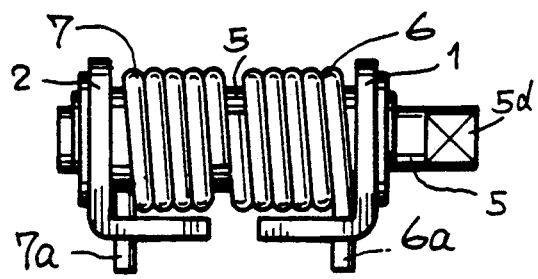
Figure 10:
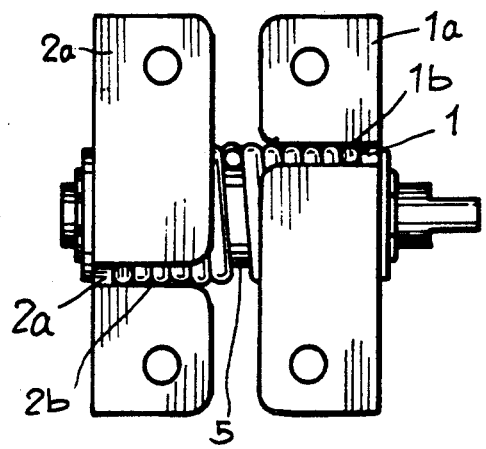

FIGS. 8 to 10 show a third embodiment of the angle adjusting device according to the present invention. In this case, there are two coil springs 6 and 7 having free ends and hook portions 7a and 6a inserted in slits 1b and 2b formed on foot portions 1a and 2a of bearings 1 and 2. When a rotational force is applied in the both directions T1 and T2 as in the first embodiment, the display device is held at a desired angle of inclination because of the total frictional force between the coil springs 6 and 7 and the large diameter portion 5c of the rotatable axis 5.

In conclusion, as described in the embodiments aforementioned, an arbitrary frictional torque on the rotatable axis or on the fixed axes is obtained because of frictional force of the two coil springs closely wound over the fixed axes and the rotatable axis.

Accordingly, an arbitrary angle adjustment of inclination of the display device is performed by combining various coil springs of different physical features, a pair of fixed axes and a rotatable axis.

What is claimed is:

1. An angle adjusting device for a display device comprising a pair of relatively movable bearings, a pair of bushings of like outer diameter fixed coaxially on the respective bearings, an axle rotatably received within said bushings, said axle having an enlarged central portion between the bushings of like outer diameter to that of the bushings, the axle further having one end extending outwardly beyond one of said bearings for application of torque to the axle, and a pair of coil springs frictionally fitted over the respective bushings and each extending over a part of said enlarged central portion of the axle.

2. An angle adjusting device according to claim 1 wherein said enlarged central portion of the axle is longer than the combined length of said bushings.

3. An angle adjusting device according to claim 1 wherein the springs each have fewer windings extending over the enlarged central portion of the axle than over the respective bushings.

4. An angle adjusting device according to claim 1 wherein the springs each have more windings extending over the enlarged central portion of the axle than over the respective bushings.

5. An angle adjusting device according to claim 1 wherein each of said bearings has a foot portion with a slot and each of said springs has an extended end received in a respective one of said slots.

6. An angle adjusting device according to claim 1 wherein said one end of said axle has a non-circular section.

* * * * *